US012184081B2

(12) United States Patent
Lu et al.

(10) Patent No.: US 12,184,081 B2
(45) Date of Patent: Dec. 31, 2024

(54) APPARATUS FOR WIRELESS CHARGING, TERMINAL AND CHARGING METHOD (71) Applicant: BEIJING XIAOMI MOBILE SOFTWARE CO., LTD., Beijing (CN)

(72) Inventors: Guangshuai Lu, Beijing (CN); Kaiqi Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 484 days.

(21) Appl. No.: 17/488,113

(22) Filed: Sep. 28, 2021

(65) Prior Publication Data
US 2022/0320902 A1 Oct. 6, 2022

(30) Foreign Application Priority Data

Mar. 30, 2021 (CN) .......................... 202110342704.7

(51) Int. Cl.
H02J 7/00 (2006.01)
H02J 7/02 (2016.01)
(Continued)

(52) U.S. Cl.
CPC .......... *H02J 50/10* (2016.02); *H02J 7/00034* (2020.01); *H02J 7/00309* (2020.01);
(Continued)

(58) Field of Classification Search
CPC .. H02J 7/00034; H02J 7/00309; H02J 7/0047; H02J 7/00712; H02J 7/007192; H02J 50/10; H02J 50/80
(Continued)

(56) References Cited

U.S. PATENT DOCUMENTS

2016/0181849 A1   6/2016   Govindaraj
2016/0190850 A1   6/2016   Jeganathan et al.
2017/0047769 A1*  2/2017   Kim ................... H02J 7/00309

FOREIGN PATENT DOCUMENTS

CN   110603708 A   12/2019
CN   111725858 A    9/2020
(Continued)

OTHER PUBLICATIONS

European Patent Application No. 21200217.4, Search and Opinion dated Mar. 18, 2022, 10 pages.
(Continued)

*Primary Examiner* — Zixuan Zhou
(74) *Attorney, Agent, or Firm* — Cozen O'Connor (57) ABSTRACT An apparatus for wireless charging includes a charger, a wireless transmitting controller and a transmitting coil. The charger is configured to output a first voltage to the wireless transmitting controller. The wireless transmitting controller is configured to boost the first voltage to obtain a second voltage, and the second voltage is greater than the first voltage. The transmitting coil is configured to perform a wireless charging capability output at the second voltage. A terminal includes a wireless receiving coil, a wireless receiving controller and a step-down processor. The wireless receiving coil receives the charging signal from an apparatus for wireless charging. The wireless receiving controller processes the charging voltage to obtain a third voltage of direct current; and the step-down processor steps down the third voltage to obtain a fourth voltage within a charging range acceptable by the terminal and charge a battery of the terminal by the fourth voltage.

18 Claims, 4 Drawing Sheets (51) Int. Cl.
  *H02J 50/10* (2016.01)
  *H02J 50/80* (2016.01)
(52) U.S. Cl.
  CPC ........ *H02J 7/0047* (2013.01); *H02J 7/00712* (2020.01); *H02J 7/007192* (2020.01); *H02J 7/02* (2013.01); *H02J 50/80* (2016.02)
(58) Field of Classification Search
  USPC .......................................... 320/108; 307/104
  See application file for complete search history.

(56) References Cited

FOREIGN PATENT DOCUMENTS

| | | | | |
|---|---|---|---|---|
| CN | 111769618 A | 10/2020 | | |
| EP | 3609037 A1 * | 2/2020 | .............. | H02J 50/10 |

OTHER PUBLICATIONS

Chinese Patent Application No. 202110342704.7, Office Action dated Jan. 12, 2024, 15 pages.
Chinese Patent Application No. 202110342704.7, English translation of Office Action dated Jan. 12, 2024, 6 pages.

* cited by examiner

APPARATUS FOR WIRELESS CHARGING, TERMINAL AND CHARGING METHOD

CROSS-REFERENCE TO RELATED APPLICATION

This application claims priority to Chinese patent application No. 202110342704.7 filed on Mar. 30, 2021, the disclosure of which is hereby incorporated by reference in its entirety.

TECHNICAL FIELD

The present disclosure relates to a field of battery charging technologies, and more particularly to an apparatus for wirelessly charging, a terminal incorporating the apparatus and a charging method.

BACKGROUND

A wide variety of electronic devices are commonly used in everyday life, such as smartphones, tablets and wearable devices. Since the electronic products continuously consume electric energy during use, in order to ensure supplying of the electrical energy for the electronic products, a charger for resupplying the electrical energy includes a transmitting end (TX end) of a power supply device (charger) that may transmit the electrical energy to a receiving end (RX end) of an electronic product to charge the electronic product.

SUMMARY

Embodiments of a first aspect of the present disclosure provide an apparatus for wireless charging. The apparatus includes a charger, a wireless transmitting controller, and a transmitting coil. The charger is configured to output a first voltage to the wireless transmitting controller. The wireless transmitting controller is configured to boost the first voltage to obtain a second voltage, and the second voltage is greater than the first voltage. The transmitting coil is configured to perform a wireless charging capability output at the second voltage.

Embodiments of a second aspect of the present disclosure provide a terminal. The terminal includes a wireless receiving coil, a wireless receiving controller and a step-down processor. The wireless receiving coil is configured to receive a charging signal from an apparatus for wireless charging, a charging voltage corresponding to the charging signal is higher than a preset voltage. The wireless receiving controller is configured to process the charging voltage received by the wireless receiving coil to obtain a third voltage of direct current. The step-down processor is configured to step down the third voltage to obtain a fourth voltage within a charging range acceptable by the terminal charge a battery of the terminal by the fourth voltage.

Embodiments of a third aspect of the present disclosure provide a charging method applicable for a terminal. The method includes: receiving a charging signal from an apparatus for wireless charging, and a charging voltage corresponding to the charging signal is higher than a preset voltage; processing the charging voltage received by a wireless receiving coil of a terminal to obtain a third voltage of direct current; stepping down the third voltage to obtain a fourth voltage within a charging range acceptable by the terminal, and charging a battery of the terminal by the fourth voltage.

Additional aspects and advantages of the present disclosure will be partially given in the following description, and some will become obvious from the following description, or be understood through practice of the present disclosure.

BRIEF DESCRIPTION OF THE DRAWINGS

The above and/or additional aspects and advantages of the present disclosure will become obvious and easy to understand from the following description of the embodiments in combination with the accompanying drawings, in which.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

Terms used in the present disclosure are merely for a purpose of describing specific embodiments but are not to limit the present disclosure. The singular forms "a," and "the" in the description and claims of the present disclosure are also intended to include the majority form unless the context clearly indicates other meanings. It should also be understood that the term "and/or" used herein refers to and comprises any or all possible combinations of one or more associated listed items.

It should be understood that although terms first, second, third, etc. may be used to describe various information in the embodiments of the present disclosure, the information should not be limited to these terms. These terms are only used to distinguish the same type of information from each other. For example, without departing from the scope of the embodiments of the present disclosure, first information may also be referred to as second information, and similarly, the second information may also be referred to as the first information. Depending on the context, words "if" used herein may be interpreted as "when" or "in response to determine".

The embodiments of the present disclosure are described in detail below. Examples of the embodiments are shown in the accompanying drawings, in which the same or similar reference numerals indicate the same or similar elements. The embodiments described below with reference to the drawings are exemplary, and are intended to explain the present disclosure, but should not be construed as limiting the present disclosure.

In a process of studying how to transmit high-power charging energy while reasonably controlling heat generation during wireless charging, the inventor found that when a power supply device (such as a charger) charges electronic products using a higher power, an operating temperature will also be higher, resulting in greater heat generation, and instability of the entire charging or charging system. Based on this, embodiments of the present disclosure propose a system, an apparatus for wireless charging, and a terminal that may increase an input voltage for wireless charging in a high-power scenario, and reduce path current and path loss simultaneously. This further reduces the heat generation, and improves charging efficiency.

The following describes the charging system, wireless charging terminal, terminal, and charging method of the electronic device according to the embodiments of the present disclosure with reference to the accompanying drawings. In embodiments, it should be noted that the terminal may be a hardware device with an operating system such as a mobile phone or a tablet computer.

Description will be made below to a system for wireless charging, an apparatus for wireless charging, a terminal and a charging method according to embodiments of the disclosure with reference to accompanying drawings. For example, the terminal may be a hardware device with an operating system such as a mobile phone, a tablet computer, etc.

Figure 1:
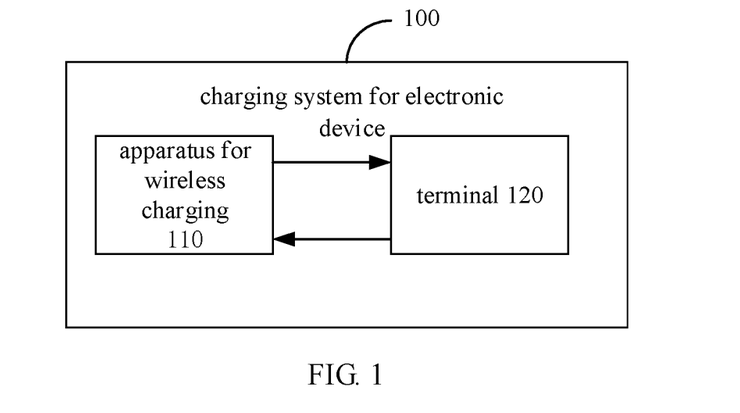
FIG. 1 is a schematic diagram illustrating a structure of a charging system for an electronic device according to an embodiment of the present disclosure.

FIG. 1 is a schematic diagram illustrating a structure of a charging system for an electronic device according to an embodiment of the present disclosure. As illustrated in FIG. 1, the charging system 100 for the electronic device includes an apparatus for wireless charging 110 and a terminal 120.

The apparatus for wireless charging 110 includes a charger, a wireless transmitting controller and a transmitting coil. The charger is configured to output a first voltage to the wireless transmitting controller. The wireless transmitting controller is configured to boost the first voltage to obtain a second voltage, and the second voltage is greater than the first voltage. The transmitting coil is configured to perform a wireless charging capability output at the second voltage.

The terminal 120 is configured to step down a charging voltage received from the apparatus for wireless charging 110, generate a stepped down charging voltage matching requirements of a battery of the terminal, and charge the battery through the stepped down charging voltage.

In an embodiment of the present disclosure, the apparatus for wireless charging 110 includes a first communication module. The first communication module communicates with a terminal, and is configured to determine a target voltage for performing wireless charging output to the terminal. The wireless transmitting controller is configured to set the second voltage as the target voltage and boost the first voltage to obtain the target voltage.

In an embodiment of the present disclosure, the first communication module is configured to determine the target voltage when establishing a connection with the terminal; and/or, in a process of wireless charging, determine the target voltage by communicating with the terminal. That is, the first communication module is configured to determine the target voltage when establishing the connection with the terminal; or, is configured to in the process of wireless charging, determine the target voltage by communicating with the terminal; is configured to determine the target voltage when establishing the connection with the terminal; and in the process of wireless charging, determine the target voltage by communicating with the terminal.

In an embodiment of the present disclosure, the first communication module includes a first communication unit or a second communication unit. The first communication unit is configured to receive the target voltage sent by the terminal. The target voltage includes a target voltage value or a target voltage level. The target voltage is determined by the terminal according to a terminal status. In embodiments, the second communication unit is configured to obtain a terminal status of the terminal and determine the target voltage according to the terminal status. The target voltage includes a target voltage value or a target voltage level.

In an embodiment of the present disclosure, the wireless transmitting controller includes a boost circuit and/or a wireless transmitting control chip. That is, the wireless transmitting controller includes the boost circuit, or includes the wireless transmitting control chip, or includes the boost circuit and the wireless transmitting control chip In an embodiment of the present disclosure, the apparatus for wireless charging 110 further includes a heat dissipation fan. The first communication module is configured to determine an operating state and/or an operating strength of the heat dissipation fan by communicating with the terminal. That is, the first communication module is configured to determine the operating state of the heat dissipation fan, or determine the operating strength of the heat dissipation fan, or determine the operating state and the operating strength of the heat dissipation fan. The heat dissipation fan is configured to operate according to the operating state and/or the operating strength.

In an embodiment of the present disclosure, the wireless transmitting controller is configured to boost the first voltage by 1:1.5 to obtain a second voltage of 30V; and the transmitting coil is configured to perform the wireless charging capability output at 30V. In this embodiment, the voltage of 30V is innovatively used for wireless charging, which can effectively reduce charging current of the transmitting coil, and further reduce heat dissipation. In addition, since the apparatus for wireless charging charges with the voltage of 30V, the voltage of 30V cannot directly charge the battery, therefore, in the embodiments of the present disclosure, the terminal is also required to step down the voltage of 30V to satisfy charging requirements of the battery.

In an embodiment of the present disclosure, the terminal 120 includes a second communication module communicated with the apparatus for wireless charging. The second communication module is configured to determine a charging voltage of the apparatus for wireless charging.

In an embodiment of the present disclosure, the second communication module is configured to determine the charging voltage of the apparatus for wireless charging when establishing a connection with the apparatus for wireless charging; and/or, in a process of wireless charging, determine the charging voltage of the apparatus for wireless charging by communicating with the apparatus for wireless charging.

In an embodiment of the present disclosure, the terminal includes an abnormality processing module. The abnormality processing module is configured to, when a charging abnormality occurs, process the abnormality to generate a fifth voltage, and send the fifth voltage to the apparatus for wireless charging.

In an embodiment of the present disclosure, the abnormality processing module includes a first abnormality processing unit and/or a second abnormality processing unit. The first abnormality processing unit is configured to, in response to the abnormality being a high temperature alarm, reduce the charging voltage to the fifth voltage, and send the fifth voltage to the apparatus for wireless charging. And/or, the second abnormality processing unit is configured to communicate with the apparatus for wireless charging to restart charging with a low level voltage in response to the abnormality being a power failure.

In an embodiment of the present disclosure, the step-down processor is configured to determine a step-down level according to the third voltage, and step down the third voltage according to the step-down level.

In an embodiment of the present disclosure, the wireless receiving controller includes a step-down circuit and/or a wireless receiving control chip.

In an embodiment of the present disclosure, step-down levels of the step-down processor respectively include 6:2, 4:2, and 2:2. In response to the third voltage corresponding to a high voltage range, the step-down processor is configured to step down the third voltage by a step-down level of 6:2. In response to the third voltage corresponding to a middle voltage range, the step-down processor is configured to step down the third voltage by a step-down level of 4:2. In response to the third voltage corresponding to a low voltage range, the step-down processor is configured to step down the third voltage by a step-down level of 2:2.

In an embodiment of the present disclosure, the high voltage range may be 30V, the middle voltage range may be 20V, and the low voltage range may be 10V.

In an embodiment of the present disclosure, the second communication module includes a third communication unit or a fourth communication unit. The third communication unit is configured to send a target voltage to the apparatus for wireless charging. The target voltage includes a target voltage value or a target voltage level. The target voltage is determined by the terminal according to a terminal status. Or the fourth communication unit is configured to send a terminal status of the terminal to the apparatus for wireless charging.

In an embodiment of the present disclosure, the second communication module includes a fifth communication unit, configured to send a fan control instruction to the apparatus for wireless charging.

The apparatus for wireless charging 110 may be configured to increase an output voltage of the apparatus for wireless charging 110 during high-power charging, so that the current of the transmitting coil may be reduced while charging power remains unchanged, and the heat generation of the transmitting coil may be reduced. At the same time, in the embodiments of the present disclosure, since the voltage output by the apparatus for wireless charging 110 is increased, the voltage of the receiving coil is relatively increased, therefore, the current of the receiving coil may also be reduced, which may effectively reduce the heat generation of the receiving coil. Therefore, in the embodiments of the present disclosure, the heat generation may be effectively reduced and the charging efficiency may be improved.

In the embodiment of the present disclosure, the apparatus for wireless charging 110 wirelessly charges the terminal 120. During the process of high-power charging, the apparatus for wireless charging 110 may increase the charging voltage, and then reduce the operating current of the coil, and the heat generation.

In an embodiment of the present disclosure, the terminal 120 includes a wireless receiving coil, a wireless receiving controller and a step-down processor. The wireless receiving coil is configured to receive a charging signal from an apparatus for wireless charging, and a charging voltage corresponding to the charging signal is higher than a preset voltage. The wireless receiving controller is configured to process the charging voltage received by the wireless receiving coil to obtain a third voltage of direct current. The step-down processor is configured to step down the third voltage to obtain a fourth voltage within a charging range acceptable by the terminal, and charge a battery of the terminal by the fourth voltage.

In an embodiment of the present disclosure, the apparatus for wireless charging 110 may wirelessly communicate with the terminal 120, and the terminal 120 may send the terminal status to the apparatus for wireless charging 110, for example, a present electricity quantity of the battery is 5%, or a present charging power is 10W and so on. It should be noted that the terminal status may include at least one of remaining capacity, temperature, charging power, and so on.

As an example, after receiving the terminal status sent by the terminal 120, the apparatus for wireless charging 110 may determine the target voltage for performing wireless charging output to the terminal, and perform the wireless charging capability output at the target voltage. The target voltage includes the target voltage value or the target voltage level.

For example, in a case that the apparatus for wireless charging 110 receives a present electricity quantity of 5%, it may be determined that the wireless charging capability output is performed at a high voltage level to the terminal. For another example in a case that the apparatus for wireless charging 110 receives a present electricity quantity of 50%, it may be determined that the wireless charging capability output is performed at a voltage of 20V.

In the embodiment of the present disclosure, after the apparatus for wireless charging 110 determines the target voltage, the charger outputs the first voltage to the wireless transmitting controller. The wireless transmitting controller boosts the first voltage to obtain the second voltage which is greater than the first voltage. The transmitting coil performs the wireless charging capability output at the second voltage. It should be noted that the apparatus for wireless charging may include, but is not limited to, the charger, the wireless transmitting controller, and the transmitting coil.

In the embodiment of the present disclosure, in order to obtain the charging voltage matching the requirements of the battery of the terminal, after receiving the target voltage sent by the apparatus for wireless charging, the terminal 120 may process the target voltage to generate the charging voltage matching the requirements of the battery, and charge the battery by the charging voltage matching the requirements of the battery of the terminal.

As an example, after the terminal 120 receives the target voltage sent by the apparatus for wireless charging, the terminal 120 may process the target voltage to obtain a DC voltage, and then step down the DC voltage to obtain the charging voltage matching the requirements of the battery of the terminal and charge the battery by the charging voltage matching the requirements of the battery of the terminal.

In an embodiment of the present disclosure, the system 100 for wireless charging includes an apparatus for wired charging. The apparatus for wired charging includes a charging component and a wired charging controller connected to the step-down processor. The charging component is configured to generate a charging voltage. The wired charging controller is configured to process the charging voltage generated by the charging component to obtain a wired charging voltage for wired charging to the terminal, and wired charge the terminal by the wired charging voltage step down by the step-down processor.

Figure 2:
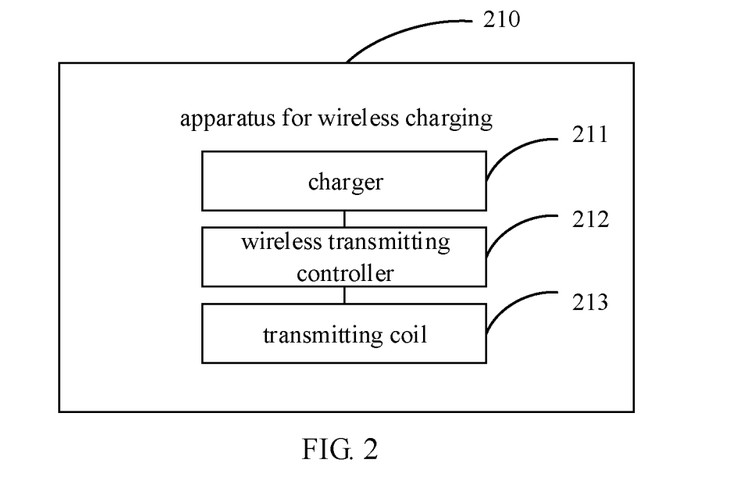
FIG. 2 is a schematic diagram illustrating a structure of an apparatus for wireless charging according to an embodiment of the present disclosure.

As an implementation of the embodiment of the present disclosure, as illustrated in FIG. 2, FIG. 2 is a schematic diagram illustrating a structure of an apparatus for wireless charging according to an embodiment of the present disclosure. The apparatus for wireless charging 210 includes a charger 211, a wireless transmitting controller 212 and a transmitting coil 213. The apparatus for wireless charging 210 may have the same function and structure as the apparatus for wireless charging 110 in the embodiment illustrated in FIG. 1.

The charger 211 outputs a first voltage to the wireless transmitting controller 212. The wireless transmitting controller 212 boosts the first voltage to obtain a second voltage which is greater than the first voltage. The transmitting coil 213 performs a wireless charging capability output at the second voltage.

As an implementation of the embodiment of the present disclosure, the apparatus for wireless charging includes a first communication module.

The first communication module communicates with a terminal, and determines a target voltage for performing wireless charging output to the terminal. The wireless transmitting controller 212 sets the second voltage as the target voltage and boosts the first voltage to obtain the target voltage.

In embodiments, when the apparatus for wireless charging 210 communicates with the terminal, the first communication module may obtain a terminal status sent by the terminal. After obtaining the terminal status, the charger 211 outputs the first voltage to the wireless transmitting controller 212. The wireless transmitting controller 212 boosts the first voltage to obtain the second voltage greater than the first voltage. The wireless transmitting controller 212 sets the second voltage as the target voltage and controls boosting of the first voltage to obtain the target voltage. The transmitting coil 213 performs the wireless charging capability output at the target voltage.

As an implementation of the embodiment of the present disclosure, the first communication module determines the target voltage when establishing a connection with the terminal; and/or, in a process of wireless charging, determines the target voltage by communicating with the terminal.

That is to say, as an example, when connecting with the terminal through the first communication module, the apparatus for wireless charging may determine the target voltage for performing wireless charging output to the terminal. As another example, during the process of wireless charging, the apparatus for wireless charging may determine the target voltage when communicating with the terminal through the first communication module. For example, in the process of wireless charging, when communicating with the terminal through the first communication module, the apparatus for wireless charging may obtain the electricity quantity of the battery of the terminal, so as to determine the target voltage for performing wireless charging output to the terminal.

As an implementation of the embodiment of the present disclosure, the first communication module includes a first communication unit or a second communication unit.

The first communication unit receives the target voltage sent by the terminal. The target voltage includes a target voltage value or a target voltage level, and the target voltage is determined by the terminal according to a terminal status. Or the second communication unit obtains a terminal status of the terminal and determines the target voltage according to the terminal status. The target voltage includes a target voltage value or a target voltage level.

In other words, the first communication module may communicate with the terminal, and determine the target voltage.

As an example, the first communication unit in the first communication module of the apparatus for wireless charging may receive the target voltage sent by the terminal, and determine the target voltage for performing wireless charging output to the terminal according to the target voltage sent by the terminal.

As another example, the second communication unit in the first communication module of the apparatus for wireless charging may receive the terminal status sent by the terminal, and determine the target voltage for performing wireless charging output to the terminal according to the terminal status. The target voltage includes the target voltage value or the target voltage level.

It should be noted that the target voltage level may include, but is not limited to, a high voltage level, a medium voltage level, a low voltage level, and so on. The terminal status may include at least one of remaining capacity, temperature, charging power, and so on.

For example, when the terminal status received by the second communication unit from the terminal is that the present remaining capacity is 5%, it may determine that the target voltage level is a high voltage level, and the apparatus for wireless charging charges the terminal at the high voltage level.

As an implementation of the embodiment of the present disclosure, the wireless transmitting controller includes a boost circuit and/or a wireless transmitting control chip.

In the embodiment of the present disclosure, the boost circuit in the wireless transmitting controller may boost the first voltage to obtain the second voltage. As an example, the first voltage is boosted by 1:1.5 to obtain a second voltage of 30V. The transmitting coil performs the wireless charging capability output at 30V. For example, taking the first voltage of 20V as an example, the first voltage is boosted by 1:1.5 to obtain a second voltage of 30V, and the transmitting coil performs the wireless charging capability output at 30V.

In order to further reduce the heat generation of the charging system and ensure the stability of the charging system, the apparatus for wireless charging further includes a heat dissipation fan.

In the embodiment of the present disclosure, the first communication module determines an operating state and/or an operating strength of the heat dissipation fan by communicating with the terminal. The heat dissipation fan operates according to the operating state and/or the operating strength In other words, when the first communication module of the apparatus for wireless charging communicates with the terminal, the first communication module may determine the operating state and the operating strength of the heat dissipation fan according to the target voltage value or target voltage level. For example, when the first communication module of the apparatus for wireless charging communicates with the terminal, the apparatus for wireless charging determines to charge the terminal at a high voltage level. In order to prevent excessive heat generation of the charging system, the strength of the fan may be strengthened to reduce the heat generation of the charging system. For example, the heat generation of the charging system may be reduced by increasing rotating speed of the fan.

Figure 3:
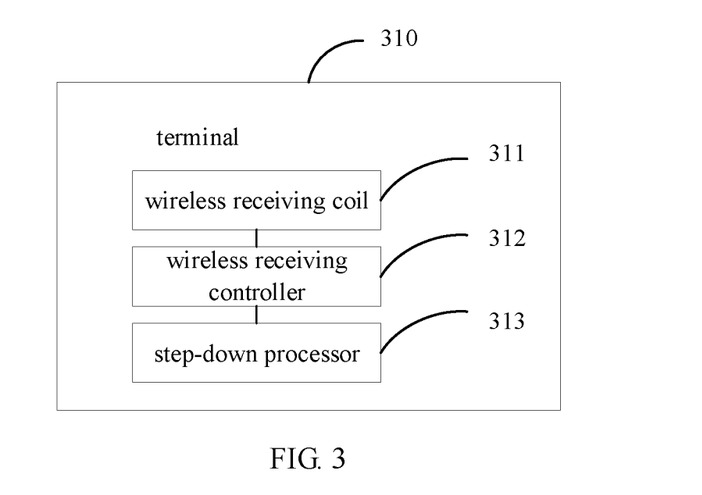
FIG. 3 is a schematic diagram illustrating a structure of a terminal according to an embodiment of the present disclosure.

As an implementation of an embodiment of the present disclosure, FIG. 3 is a schematic diagram illustrating a structure of a terminal according to an embodiment of the present disclosure. As illustrated in FIG. 3, the terminal 310 includes a wireless receiving coil 311, a wireless receiving controller 312 and a step-down processor 313. The terminal 310 may have the same function and structure as the terminal 120 in the embodiment illustrated in FIG. 1.

The wireless receiving coil 311 is configured to receive a charging signal from an apparatus for wireless charging. A charging voltage corresponding to the charging signal is higher than a preset voltage. The wireless receiving controller 312 is configured to process the charging voltage received by the wireless receiving coil to obtain a third voltage of direct current. The step-down processor 313 is configured to step down the third voltage to obtain a fourth voltage within a charging range acceptable by the terminal, and charge a battery of the terminal 310 by the fourth voltage.

As an implementation of the embodiment of the present disclosure, the terminal 310 includes a second communication module communicated with the apparatus for wireless charging. The second communication module is configured to determine a charging voltage of the apparatus for wireless charging.

In other words, when the terminal 310 communicates with the apparatus for wireless charging, the terminal 310 may send the terminal status to the apparatus for wireless charging through the second communication module in the terminal 310. After receiving the terminal status sent by the terminal, the apparatus for wireless charging may adjust a transmission voltage of the wireless charging terminal to the target voltage and send the charging signal to the terminal. The wireless receiving coil 311 in the terminal is configured to receive the charging signal from the apparatus for wireless charging. The wireless receiving controller 312 is configured to process the charging voltage received by the wireless receiving coil to obtain the third voltage of direct current according to the charging voltage corresponding to the charging signal. Then, in order to reduce charging temperature of the charging system, in response to the third voltage belonging to a high voltage range (such as 25V-35V), the step-down processor 313 may be configured to step down the third voltage to obtain a fourth voltage within the charging range acceptable by the terminal, and charge the battery of the terminal by the fourth voltage.

As an implementation of the embodiment of the present disclosure, the second communication module is configured to determine the charging voltage of the apparatus for wireless charging when establishing a connection with the apparatus for wireless charging; and/or, in a process of wireless charging, determine the charging voltage of the apparatus for wireless charging by communicating with the apparatus for wireless charging.

In other words, as an example, when the second communication module in the terminal establishes a connection with the apparatus for wireless charging, the charging voltage of the apparatus for wireless charging may be determined. As another example, during the process of wireless charging, the second communication module in the terminal communicates with the apparatus for wireless charging and determines the charging voltage of the apparatus for wireless charging.

In an embodiment of the present disclosure, when a charging abnormality occurs in the terminal, the wireless receiving controller processes the abnormality to generate a fifth voltage, and sends the fifth voltage to the apparatus for wireless charging.

As an example, in response to the abnormality being a high temperature alarm, the wireless receiving controller reduces the charging voltage. As another example, in response to the abnormality being a power failure, the wireless receiving controller communicates with the apparatus for wireless charging through the second communication module to restart charging with a low level voltage In an embodiment of the present disclosure, the terminal includes an abnormality processing module.

The abnormality processing module is configured to, when the charging abnormality occurs, process the abnormality to generate the fifth voltage, and send the fifth voltage to the apparatus for wireless charging.

As an example, the abnormality processing module includes a first abnormality processing unit and/or a second abnormality processing unit.

The first abnormality processing unit is configured to, in response to the abnormality being the high temperature alarm, reduce the charging voltage to the fifth voltage, and send the fifth voltage to the apparatus for wireless charging. And/or the second abnormality processing unit is configured to, in response to the abnormality being the power failure, communicate with the apparatus for wireless charging to restart charging with the low level voltage.

As an implementation of the embodiment of the present disclosure, the terminal 310 includes a wired charging interface and a wired charging controller.

In order to obtain the voltage within the charging range acceptable by the terminal, in the embodiment of the present disclosure, the wired charging controller is configured to control the charging interface to be connected to the step-down processor when the wired charging interface is connected to a charger.

In an embodiment of the present disclosure, the step-down processor is configured to step down the third voltage to obtain the fourth voltage within the charging range acceptable by the terminal, and charge the battery of the terminal by the fourth voltage. As an example, the step-down processor may determine a step-down level according to the third voltage, and step down the third voltage according to the step-down level. It should note is that the wireless receiving controller may include a step-down circuit and/or a wireless receiving control chip.

For example, step-down levels may include multiple preset levels, such as, 6:2, 4:2, 2:2. In response to the third voltage corresponding to a high voltage range, for example, the high voltage range is 25V-35V, the step-down processor steps down the third voltage by a step-down level of 6:2. In response to the third voltage corresponding to a medium voltage range, for example, the medium voltage range is 15V-25V, the step-down processor steps down the third voltage by a step-down level of 4:2. In response to the third voltage corresponding to a low voltage range, for example, the low voltage range is 5V-15V, and the step-down processor steps down the third voltage by a step-down level of 2:2.

In an embodiment of the present disclosure, the second communication module includes a third communication unit or a fourth communication unit.

The third communication unit is configured to send a target voltage to the apparatus for wireless charging. The target voltage includes a target voltage value or a target voltage level. The target voltage is determined by the terminal according to the terminal status. Or the fourth communication unit is configured to send a terminal status of the terminal to the apparatus for wireless charging.

In other word, when the terminal communicates with the apparatus for wireless charging, the terminal may determine to the target voltage sent to the apparatus for wireless charging according to the present terminal state, the third communication unit may be configured to send the target voltage to the apparatus for wireless charging, and the fourth communication unit may be configured to send the terminal status of the terminal to the apparatus for wireless charging.

As an implementation of the embodiment of the present disclosure, the second communication module includes a fifth communication unit. The fifth communication unit is configured to send a fan control instruction to the apparatus for wireless charging.

In other words, in order to prevent excessive speed of the fan from causing excessive noise and affecting charging experience of users, the fifth communication unit may be configured to send the fan control instruction to the apparatus for wireless charging to control rotating speed of the fan, which may reduce noise, and improve user experience.

In order to enable those skilled in the art to understand the present disclosure more clearly, examples are now described.

Figure 4:
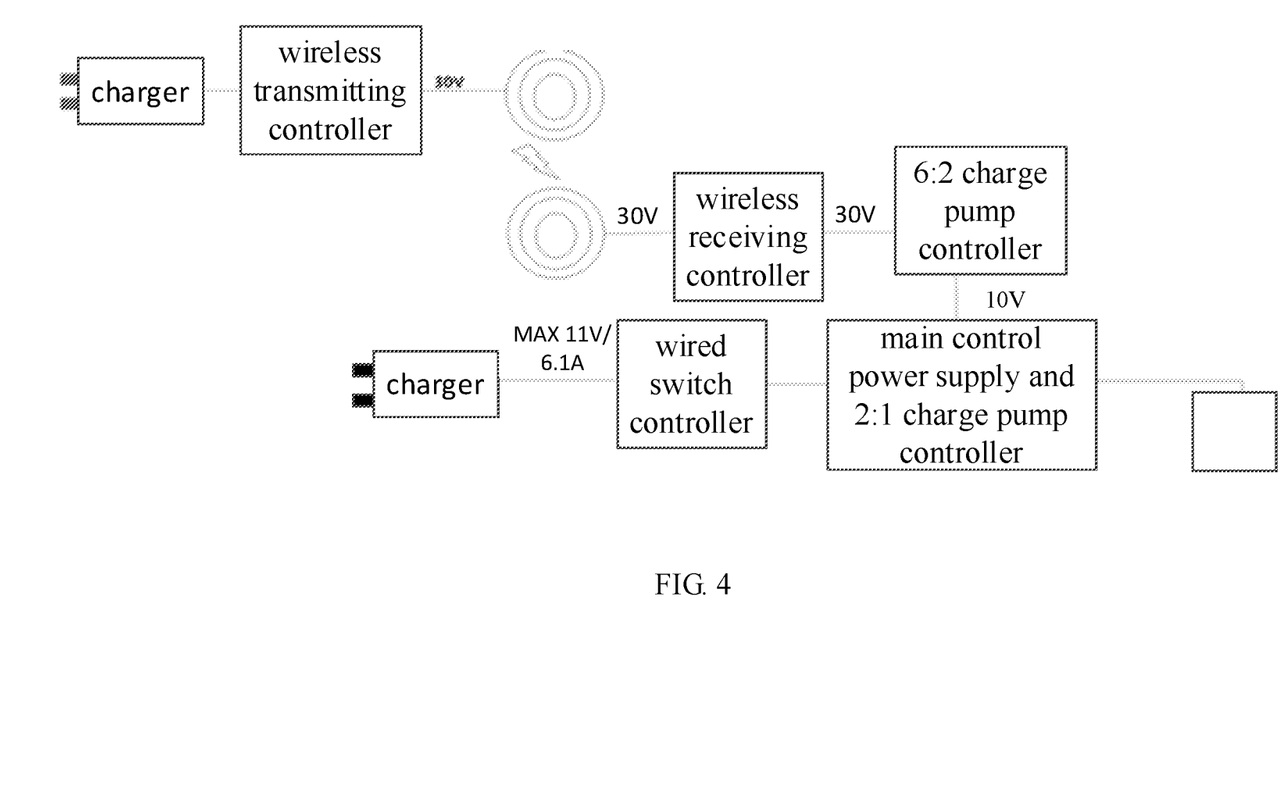
FIG. 4 is a schematic diagram illustrating voltage transmission between a transmitting end and a receiving end in an embodiment of the present disclosure.

For example, as illustrated in FIG. 4, a wireless charging path is as follows. At a TX end, a charger input of 5-20V is boosted to generate a voltage close to 5-30V (the maximum boost multiple is approximately 6 times the voltage of the battery), and then the boosted voltage is wirelessly transmitted to a RX end. The wireless controller converts an AC voltage of 5-30V into a stable DC voltage of 5-30V, and then converts to a voltage of 5-10V through a 6:2/4:2/2:2 charge pump. Then the voltage of 5-10V is converted into a voltage of 2-5V (close to the voltage of the battery) through a main control power supply and a 2:1 charge pump controller to charge the battery.

A wired charging path is as follows: the charger converts an AC voltage of 220V into a DC voltage of MAX 11V, 6.1 A or a voltage of 5-20V. After passing through a wired switch controller, the converted voltage enters the main control power supply and the 2:1 charge pump controller is converted into a voltage of 2-5V (close to the voltage of the battery) to charge the battery.

In the wireless charging path, the TX end is equivalent to the apparatus for wireless charging of the embodiment of the present disclosure, and the RX end is equivalent to the terminal of the embodiment of the present disclosure. In FIG. 4, the 6:2 charge pump controller, the main control power supply and the 2:1 charge pump controller are equivalent to the step-down processor in the terminal of the embodiment of the present disclosure.

Figure 5:
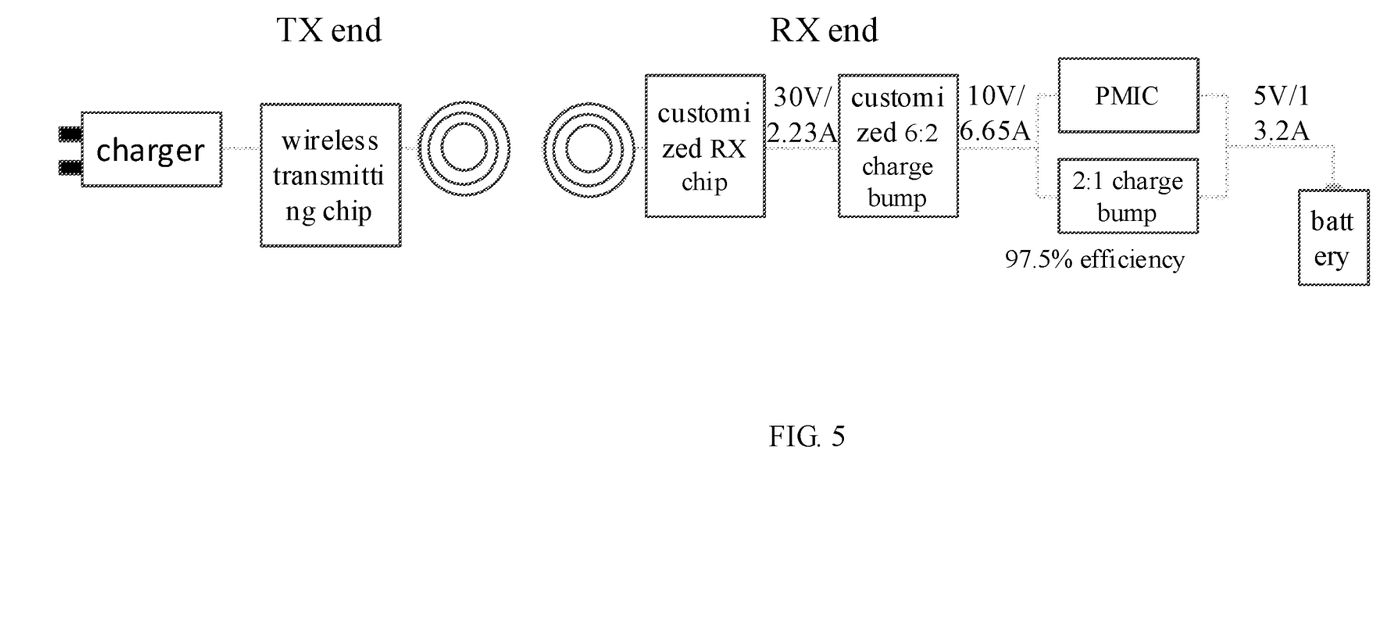
FIG. 5 is a schematic diagram illustrating voltage transmission between the transmitting end and the receiving end according to an embodiment of the present disclosure.

For another example, as illustrated in FIG. 5, a wireless charging path is as follows. At a TX end, a charger input of 5-20V is boosted to generate a voltage close to 5-30V (the maximum boost multiple is approximately 6 times the voltage of the battery), and then the boosted voltage is wirelessly transmitted to a RX end through a coil. A customized RX chip (equivalent to a wireless controller) converts an AC voltage of 5-30V into a stable DC voltage of 5-30V, and then converts to a voltage of 5-10V through a 6:2/4:2/2:2 charge pump. Then the voltage of 5-10V is converted into a voltage of 2-5V (close to the battery voltage) through a PMIC (Power Management IC) and a 2:1 charge pump controller to charge the battery. In the wireless charging path, the TX end is equivalent to the apparatus for wireless charging of the embodiment of the present disclosure, and the RX end is equivalent to the terminal of the embodiment of the present disclosure. The 6:2/4:2/2:2 charge pump and the PMIC and the 2:1 charge pump are equivalent to the step-down processor of the embodiment of the present disclosure, and the customized RX chip is equivalent to the wireless receiving controller in the terminal of the embodiment of the present disclosure.

Figure 6:
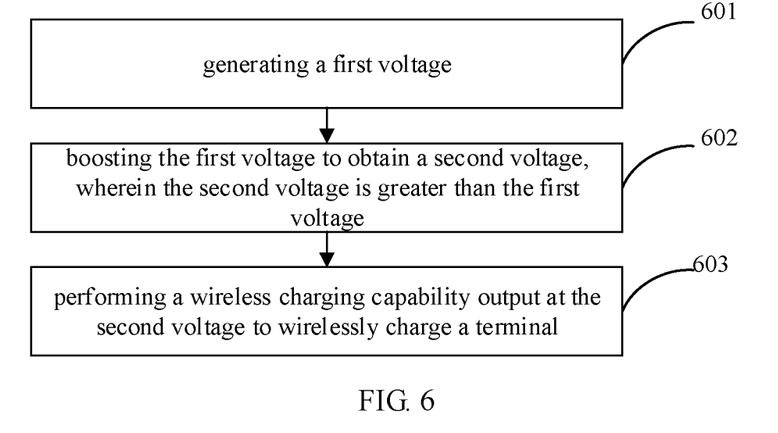
FIG. 6 is a flowchart illustrating a charging method according to an embodiment of the present disclosure.

Corresponding to the charging system of the electronic device provided in the embodiment of FIG. 1, the present disclosure also provides a charging method. As illustrated in FIG. 6, FIG. 6 is a flowchart illustrating a charging method according to an embodiment of the present disclosure. It should be noted that the charging method provided in the embodiment of the present disclosure corresponds to the charging system of the electronic device provided in the embodiment of FIG. 1, so the implementation of the charging system of the electronic device is also applicable to the charging method provided in the embodiment of the disclosure. An execution body of the charging method may be an apparatus for wireless charging. The charging method of the embodiment illustrated in FIG. 6 may include the following blocks.

At block 601, a first voltage is generated.

At block 602, the first voltage is boosted to obtain a second voltage. The second voltage is greater than the first voltage.

At block 603, a wireless charging capability output is performed at the second voltage to wirelessly charge a terminal.

Figure 7:
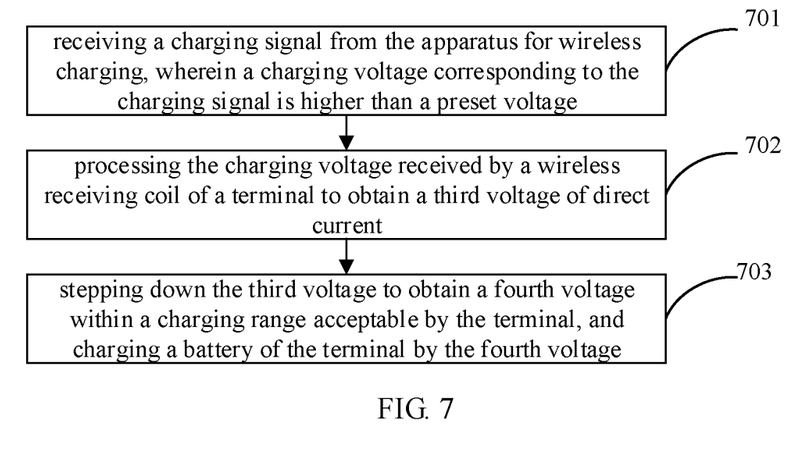
FIG. 7 is a flowchart illustrating a charging method p according to an embodiment of the present disclosure.

In order to implement the above-mentioned embodiments, the present disclosure also proposes another charging method. As illustrated in FIG. 7, FIG. 7 is a flowchart illustrating a charging method according to an embodiment of the present disclosure. An execution body of the charging method is a terminal. The charging method illustrated in FIG. 7 may include the following blocks.

At block 701, a charging signal is received from the apparatus for wireless charging. A charging voltage corresponding to the charging signal is higher than a preset voltage.

At block 702, the charging voltage received by a wireless receiving coil of a terminal is processed to obtain a third voltage of direct current.

At block 703, the third voltage is stepped down to obtain a fourth voltage within a charging range acceptable by the terminal, and a battery of the terminal is charged by the fourth voltage.

In embodiments of the present disclosure, additional technical features of the above methods may be referred to the features of the apparatus for wireless charging and the terminal mentioned in embodiments of FIGS. 1-5.

According to the embodiments of the present disclosure, when performing high-power charging, the apparatus for wireless charging may output a high voltage for wireless charging transmission, which may reduce an operating current of the transmitting coil of the apparatus for wireless charging, and reduce heat generation of the apparatus for wireless charging to enable the system to be more stable.

To implement the above embodiments, the present disclosure provides a non-transitory computer readable storage medium having a computer instruction stored thereon.

With the non-transitory computer readable storage medium provided in the present disclosure, the computer instruction is configured to cause a computer to execute the charging methods according to the above embodiments illustrated in FIGS. 6-7.

To implement the above embodiments, the present disclosure provides a computer program product including a computer program.

With the computer program product provided in the present disclosure, the computer program is configured to implement the charging methods according to the above embodiments illustrated in FIGS. 6-7 when executed by a processor.

Those skilled in the art easily think of other embodiments of the present disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. An apparatus for wireless charging, comprising:
a charger, a wireless transmitting controller, a transmitting coil, a first communication module and a heat dissipation fan;
wherein, the charger is configured to output a first voltage to the wireless transmitting controller;
the wireless transmitting controller is configured to boost the first voltage to obtain a second voltage, wherein the second voltage is greater than the first voltage;
the transmitting coil is configured to perform wireless charging at the second voltage;
the first communication module is configured to communicate with a terminal, and configured to determine a target voltage for performing wireless charging output to the terminal;
the wireless transmitting controller is configured to set the second voltage as the target voltage and boost the first voltage to obtain the target voltage;
the first communication module is configured to determine an operating strength of the heat dissipation fan according to the target voltage by communicating with the terminal, and the heat dissipation fan is configured to operate according to the operating strength; or the first communication module is configured to determine an operating state and an operating strength of the heat dissipation fan according to the target voltage by communicating with the terminal, and the heat dissipation fan is configured to operate according to the operating state and the operating strength.

2. The apparatus according to the claim 1, wherein the first communication module is configured to determine the target voltage when establishing a connection with the terminal; and/or, in a process of wireless charging, determine the target voltage by communicating with the terminal.

3. The apparatus according to the claim 1, wherein the first communication module comprises:
a first communication unit, configured to receive the target voltage sent by the terminal, wherein the target voltage comprises a target voltage value or a target voltage level; the target voltage is determined by the terminal according to a terminal status; or a second communication unit, configured to obtain a terminal status of the terminal and determine the target voltage according to the terminal status, wherein the target voltage comprises a target voltage value or a target voltage level.

4. The apparatus according to the claim 1, wherein the wireless transmitting controller comprises:
a boost circuit and/or a wireless transmitting control chip.

5. The apparatus according to the claim 1, wherein,
the wireless transmitting controller is configured to boost the first voltage to obtain a second voltage of at least 30V; and
the transmitting coil is configured to perform the wireless charging capability output at the second voltage of at least 30V.

6. A terminal, comprising:
a wireless receiving coil, a wireless receiving controller and a step-down processor;
wherein the wireless receiving coil is configured to receive a charging signal from an apparatus for wireless charging according to claim 1, and a charging voltage corresponding to the charging signal is higher than a preset voltage;
the wireless receiving controller is configured to process the charging voltage received by the wireless receiving coil to obtain a third voltage of direct current; and
the step-down processor is configured to step down the third voltage to obtain a fourth voltage within a charging range acceptable by the terminal, and charge a battery of the terminal by the fourth voltage.

7. The terminal according to claim 6, wherein the wireless receiving controller comprises a step-down circuit and/or a wireless receiving control chip.

8. The terminal according to claim 6, wherein step-down levels of the step-down processor respectively comprise 6:2, 4:2, and 2:2, wherein,
in response to the third voltage corresponding to a high voltage range, the step-down processor is configured to step down the third voltage by a step-down level of 6:2;
in response to the third voltage corresponding to a medium voltage range, the step-down processor is configured to step down the third voltage by a step-down level of 4:2;
in response to the third voltage corresponding to a low voltage range, the step-down processor is configured to step down the third voltage by a step-down level of 2:2.

9. A charging method, applicable for a terminal and comprising:
receiving a charging signal from an apparatus for wireless charging according to claim 1, wherein a charging voltage corresponding to the charging signal is higher than a preset voltage;
processing the charging voltage received by a wireless receiving coil of the terminal to obtain a third voltage of direct current; and
stepping down the third voltage to obtain a fourth voltage within a charging range acceptable by the terminal, and charging a battery of the terminal by the fourth voltage.

10. The method according to claim 9, comprising:
communicating with the apparatus for wireless charging; and
determining a charging voltage of the apparatus for wireless charging.

11. The method according to claim 10, comprising:
determining a charging voltage of the apparatus for wireless charging when establishing a connection with the apparatus for wireless charging; and/or in a process of wireless charging, determining the charging voltage of the apparatus for wireless charging by communicating with the apparatus for wireless charging.

12. The method according to claim 9, comprising:
when a charging abnormality occurs, processing the abnormality to generate a fifth voltage, and sending the fifth voltage to the apparatus for wireless charging.

13. The method according to claim 12, wherein processing the abnormality to generate the fifth voltage and sending the fifth voltage to the apparatus for wireless charging comprises:
in response to the abnormality being a high temperature alarm, reducing the charging voltage to the fifth voltage, and sending the fifth voltage to the apparatus for wireless charging; and/or
in response to the abnormality being a power failure, communicating with the apparatus for wireless charging to restart charging with a low level voltage.

14. The method according to claim 9, comprising:
determining a step-down level according to the third voltage; and
stepping down the third voltage according to the step-down level.

15. The method according to claim 9, wherein step-down levels respectively comprise 6:2, 4:2, and 2:2, and stepping down the third voltage comprises:

in response to the third voltage corresponding to a high voltage range, stepping down the third voltage by a step-down level of 6:2;
in response to the third voltage corresponding to a medium voltage range, stepping down the third voltage by a step-down level of 4:2;
in response to the third voltage corresponding to a low voltage range, stepping down the third voltage by a step-down level of 2:2.

16. The method according to claim 15, wherein, the high voltage range is 30V, the middle voltage range is 20V, and the low voltage range is 10V.

17. The method according to claim 10, wherein communicating with the apparatus for wireless charging comprises:
sending a target voltage to the apparatus for wireless charging, wherein the target voltage comprises a target voltage value or a target voltage level, and the target voltage is determined by the terminal according to a terminal status; or
sending a terminal status of the terminal to the apparatus for wireless charging.

18. The method according to claim 17, wherein communicating with the apparatus for wireless charging comprises:
sending a fan control instruction to the apparatus for wireless charging.

* * * * *